United States Patent [19]
Nash

[11] 4,078,190

[45] Mar. 7, 1978

[54] CONTROL SYSTEM FOR REGULATING THE SPEED OF AN ELECTRIC MOTOR INCLUDING STATIC FREQUENCY DETECTOR FOR SPEED DETECTION AND REGULATION

[75] Inventor: James N. Nash, New Berlin, Wis.

[73] Assignee: Harnischfeger Corporation, West Milwaukee, Wis.

[21] Appl. No.: 698,772

[22] Filed: Jun. 22, 1976

[51] Int. Cl.² .......................................... H02P 5/40
[52] U.S. Cl. ................................................ 318/227
[58] Field of Search ....................... 318/227, 230, 231

[56] References Cited

U.S. PATENT DOCUMENTS

| | | | |
|---|---|---|---|
| 3,719,873 | 3/1973 | Graf | 318/227 |
| 3,753,064 | 8/1973 | Agarwal et al. | 318/227 |

*Primary Examiner*—Herman J. Hohauser
*Attorney, Agent, or Firm*—James E. Nilles

[57] ABSTRACT

A control system for regulating the torque and speed of an alternating current wound rotor motor used in the traverse drive of an overhead travelling crane comprises an SCR bank controlled by a firing circuit responsive to actuation of an operator-controlled induction master control. The control system further comprises means for deriving a torque signal indicative of instantaneous rotor torque, means for deriving a speed signal indicative of instantaneous rotor speed, and summing means for combining the torque signal, the speed signal, and a reference signal from the induction master control to provide an error signal which is used to operate the firing circuit to thereby control the power delivered by the SCR bank to the motor and insure that motor torque is constant for the speed selected. The means for deriving the speed signal measures the instantaneous frequency of the instantaneous current flow in the rotor (secondary).

11 Claims, 12 Drawing Figures

CONTROL SYSTEM FOR REGULATING THE SPEED OF AN ELECTRIC MOTOR INCLUDING STATIC FREQUENCY DETECTOR FOR SPEED DETECTION AND REGULATION

BACKGROUND OF THE INVENTION

1. Field of Use

This invention relates generally to a control system for regulating the torque and speed of a wound rotor electric motor such as is used, for example, in the traverse drive of an overhead travelling crane.

2. Description of the Prior Art

In the operation of overhead travelling cranes used in industry, it is desirable to be able to regulate the torque and speed of the traverse drive motor to provide for smooth acceleration, tight speed regulation, and good inching performance so as to reduce or prevent swinging or jerking of a load suspended from the crane hook as the traverse drive motor is started, stopped, accelerated, decelerated, and during transitions between forward and reverse movement. Heretofore, in some cranes where the traverse wheels were driven by an alternating current wound rotor motor, primary or secondary reactors were employed to regulate power in the motor. Banks of SCR's have also been used to regulate primary power. DC choppers have been used to effectively change secondary resistance and thus effect motor control. As implemented most of these control schemes obtain torque and speed control through similar methods. Torque control has in general really been a current control. This leads to a rather nonlinear torque/speed characteristic. In the past it has been up to the operator to compensate for these nonlinearities. Speed control has been obtained through the use of a DC tachometer. This provides excellent control but distracts from the simplicity and ruggedness normally attributed to an AC induction drive. Where torque and speed have been used in conjunction with one another it has been a simple summing circuit which in general was accompanied by poor regulation.

SUMMARY OF THE INVENTION

The traverse drive of an overhead travelling crane employs an alternating current wound rotor motor, and a control system is provided for regulating the torque and speed of the motor. The control system comprises a bank of SCRs which regulate the electric power applied to the motor in response to an actuation of an operator controlled induction master control. The control system further comprises means for deriving a voltage signal indicative of the instantaneous voltage in the motor stator winding; means for deriving a current signal indicative of the instantaneous current in the motor stator winding; and means for multiplying the voltage and current signals to provide a wattage signal which is proportional to the instantaneous torque being developed in the motor. The control system further comprises means for deriving a speed signal which is indicative of instantaneous motor speed; means, including a logic circuit, for combining the aforesaid torque signal and speed signal to provide a feedback signal; and means, including a summing circuit, wherein the feedback signal is compared to a reference signal from the induction master control to provide an error signal which is applied via a regulator to the firing pulse generators to thereby regulate the bank of SCRs to effect torque and speed control of the motor. The means for deriving the speed signal indicative of instantaneous motor speed measures the instantaneous frequency of the instantaneous current flow in the rotor (secondary). This frequency bears a direct relationship to the speed of rotor rotation, assuming fixed frequency excitation of the motor stator (primary). The means for measuring the instantaneous frequency in the rotor comprise frequency detector means to extract the fundamental frequency from the motor rotor (secondary) waveform and means to convert the fundamental frequency into an analog voltage proportional to speed. The control means further comprise a plugging logic circuit or frequency comparator which puts out 0 or 1 logic signal indicative of whether or not motor plugging is taking place.

In a control system in accordance with the invention the torque signal is derived from two sources, namely, from a voltage signal indicative of the line-to-neutral voltage in the motor stator, and a current signal proportional to the current in one of the phase lines to the motor. The aforesaid signals representative of voltage and current are directed to a multiplier circuit which converts them to the torque signal, which takes the form of a voltage signal proportional to the torque being developed by the motor.

A control system in accordance with the present invention effects regulation of both torque and speed of the motor to provide smoother acceleration (due to smoother torque control), more tightly regulated speed, better inching speed, and prevention of jerking and swinging of the crane load. In a control system in accordance with the invention both torque and speed are automatically regulated, and both torque and speed are proportional to the throw of a single operator's handle. The present invention overcomes the above-described drawbacks of prior art systems in that it provides true torque control, thereby eliminating the non-linearities. It provides accurate speed control with a DC tachometer or any other shaft-mounted transducer. It provides an adjustable speed/torque characteristic which under normal conditions does not affect system regulation. The above improvements eliminate wheel spin and jerk and greatly reduce load swing. In general, the traverse motion becomes easier for the operator to control. Other objects and advantages of the invention will hereinafter appear.

DESCRIPTION OF A PREFERRED EMBODIMENT

Figure 1:
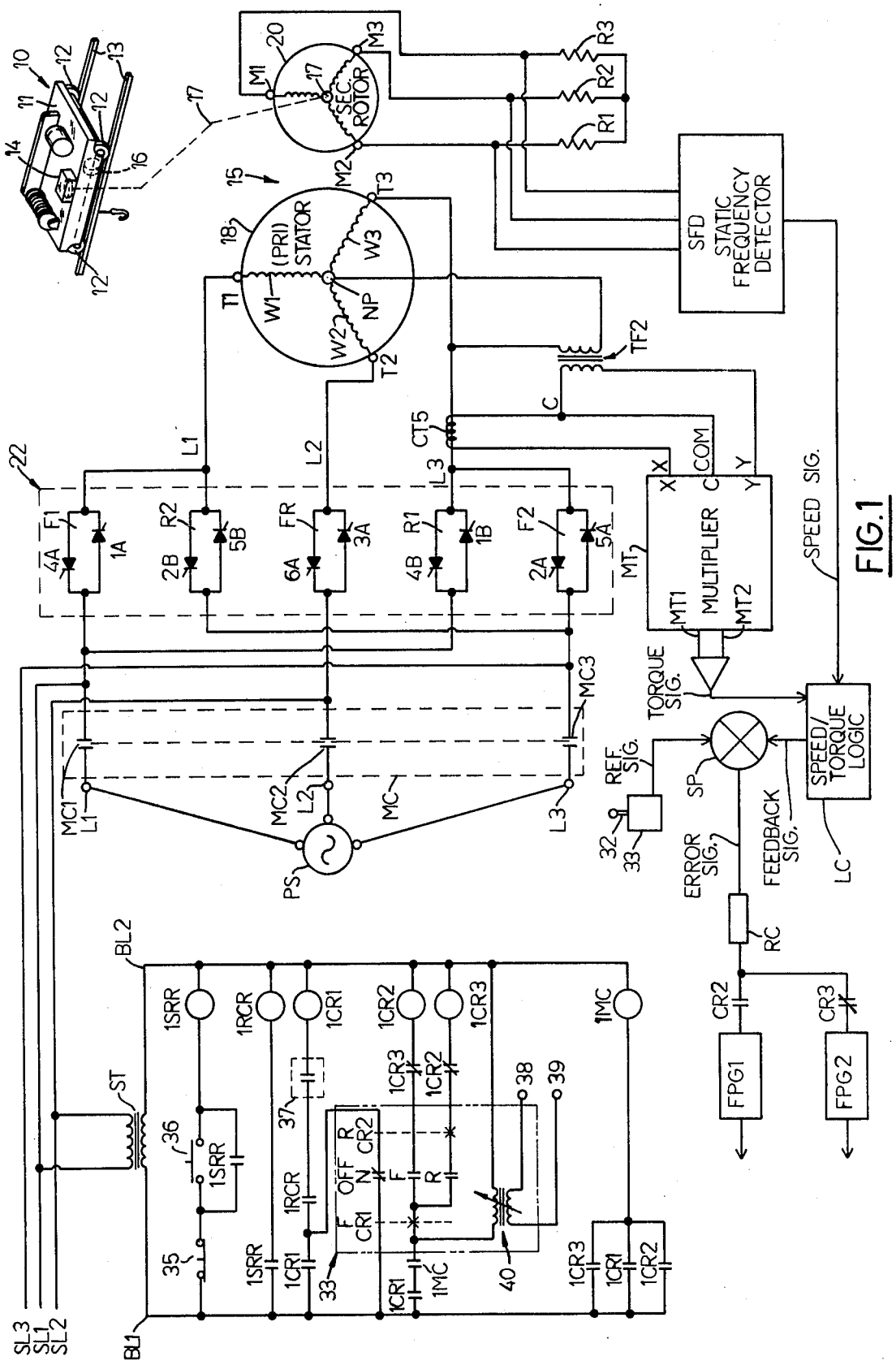
FIG. 1 is a schematic diagram of a motor control system in accordance with the present invention for the motor of the traverse drive of an overhead travelling crane.

Referring to FIG. 1 of the drawing, the numeral 10 designates an overhead travelling crane which comprises a carriage 11 having four traverse wheels 12 by means of which the crane is supported and driven on a pair of overhead rails 13. Two of the wheels, for example, are driven in a conventional manner through a traverse drive mechanism 14 by an alternating current wound rotor motor 15 which is mounted on the carriage 11 of crane 10. A spring applied electrically releasable brake 16 is provided for the shaft 17 of motor 15 and the wheels 12 which it drives.

FIG. 1 shows a control system in accordance with the invention which is provided for regulating the torque and speed of the motor 15. Generally considered, the control system comprises a bank 22 of SCRs controlled by firing pulse generators FPG 1 and FPG 2 which regulate the electric power applied to the motor 15 from an alternating current power source PS in response to an actuation of an operator controlled induction master control 33. The control system further comprises means, including a transformer TF2, for deriving a voltage signal indicative of the instantaneous voltage in the motor stator (primary) winding 18; means, including current transformers CT5, for deriving a current signal indicative of the instantaneous current in the motor stator winding 18; and means, including a multiplier MT, for multiplying the voltage and current signals to provide a wattage or torque signal which is proportional to the instantaneous torque being developed in the motor 15. The control system further comprises means, hereinafter described, for deriving a speed signal which is indicative of instantaneous motor speed; means, including a logic circuit LC, for combining the aforesaid torque signal and speed signal (after motor torque exceeds a predetermined torque) to provide a feedback signal; and means, including a summing circuit SP, wherein the feedback signal is compared to a reference signal from the induction master control 33 to provide an error signal which is applied to the firing pulse generators FPG1 and FPG2 via a regulator RC to thereby regulate the bank 22 of SCRs to effect torque and speed control of the motor 15. The aforementioned means for deriving the speed signal indicative of instantaneous motor speed takes the form of a static frequency detector SFD which measures the frequency of the instantaneous rotor voltage. This frequency bears a direct relationship to the speed of rotor rotation, assuming fixed frequency excitation of the motor stator (primary). The means for measuring the instantaneous frequency in the rotor comprise frequency detector means to extract the fundamental frequency from the motor rotor (secondary) waveform and means to convert the fundamental frequency into an analog voltage proportional to speed. The control means further comprise a plugging logic circuit or frequency comparitor which puts out 0 or 1 logic signal indicative of whether or not motor plugging is taking place. This logic signal is in turn used by the logic circuit LC to determine which speed/torque curves apply.

As FIG. 1 shows, the motor 15 comprises a stator (or primary winding) having terminals T1, T2, and T3, and a rotor (or secondary winding) 20 having terminals M1, M2, and M3. Motor stator 18 has three star-connected stator windings W1, W2, and W3 which are all joined together at a neutral point designated NP. The motor 15 and control system are energizable from, for example, a 460 volt three phase 60Hz alternating current power source PS connected to the phase lines L1, L2, and L3. The phase lines L1, L2, and L3 are connectable to the motor stator terminals T1, T2, and T3, respectively, through the contacts of a conventional motor contactor IMC having contacts MC1, MC2, and MC3 and through an SCR bank 22. The phase lines L1, L2, and L3 are also connectable to the motor control system as hereinafter explained. The motor rotor 20 has a bank of 30% slip resistors R1, R2, and R3 connected in circuit with the rotor terminals M1, M2, and M3 in a conventional manner.

As FIG. 1 shows, the SCR bank 22 comprises five pairs of SCRs (silicon controlled rectifiers), designated F1, F2, R1, R2, and FR which are arranged in circuit in the phase lines L1, L2, and L3, between contactor MC and the motor stator terminals T1, T2, and T3. Each of the five pairs of SCRs comprises a pair of SCRs connected in parallel with each other in oppositely poled relationship. Pair R1 comprising SCR1B and SCR4B is connected between phase line L1 and motor stator terminal T3. Pair F1 comprising SCR1A and SCR4A is connected between phase line L1 and motor stator terminal T1. Pair FR comprising SCR3 and SCR6 is connected between phase line L2 and motor stator terminal T2. Pair F2 comprising SCR5A and SCR2A is connected between phase line L3 and motor stator terminal T3. Pair R2 comprising SCR5B and SCR2B is connected between phase line L3 and motor stator terminal T1. The SCR pairs F1, F2, and FR are operative to connect the motor for operation in a forward direction, and the SCR pairs R1, R2, and FR are operative to connect the motor for operation in the reverse direction.

Figure 2:
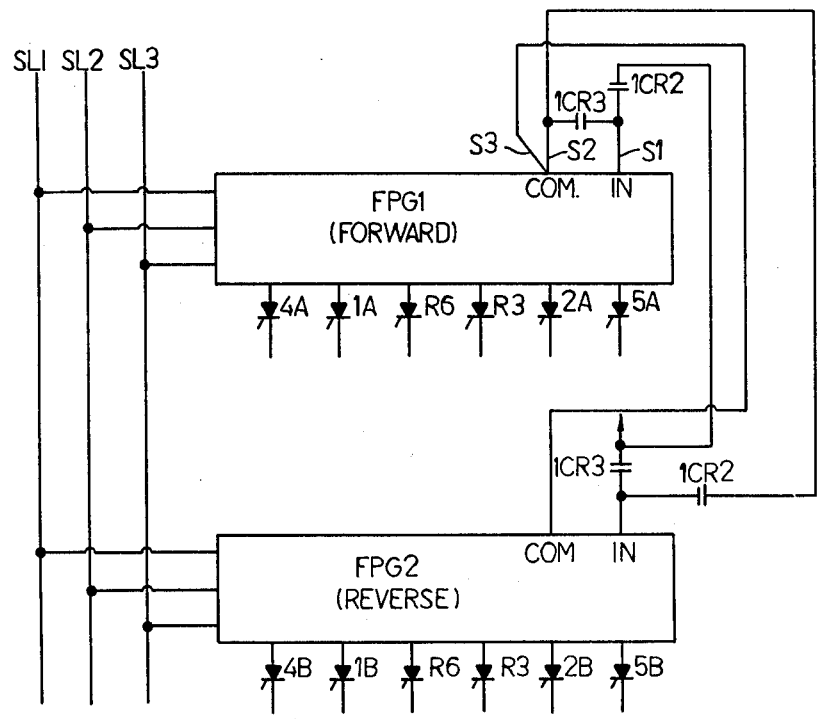
FIG. 2 is a schematic diagram of the firing pulse generator circuits for the SCR bank shown in FIG. 1.

The SCR bank 22 controls or regulates the energization of motor 15, the direction of rotation of the motor, and the speed and torque of the motor in response to control signals received from firing pulse generators FPG1 and FPG2. Firing pulse generator FPG1 controls forward operations of motor 15, and firing pulse generator FPG2 controls reverse operations of the motor. The circuitry and mode of operation of an SCR bank such as 22 and firing pulse generators such as FPG1 and FPG2 are described in detail in U.S. patent application Ser. No. 607,601 filed Aug. 25, 1975, by Price and Nash for "Direct Current Braking Means for Wound Rotor Motor" and assigned to the same assignee as the present application. As FIG. 2 shows, the firing pulse generators FPG1 and FPG2 are connected to and energizable from the phase lines L1, L2, and L3 by the supply lines SL1, SL2, and SL3, respectively. The firing pulse generators FPG1 and FPG2 are also interconnected by signal input lines S1, S2, and S3, which are provided with normally open relay contacts 1CR2 and 1CR3 which are controlled by control relays shown in FIG. 1 and bearing similar designations. As FIG. 1 shows, the firing pulse generator FPG1 effects operation of the following SCRs: SCR4A, SCR1A, SCR6, SCR3, SCR2A, SCR5A. Firing pulse generator FPG2 operates SCR4B, SCR1B, SCR6, SCR3, SCR2B, SCR5B.

Referring to FIG. 1, there is shown a diagram of the circuit for controlling the energization of the motor 15 and the control system. This circuit comprises a step-down transformer ST which has its primary winding connected across the phase lines SL1 and SL2 and which has its secondary winding connected to energize two bus lines BL1 and BL2. As FIG. 1 shows, an induction master control 33 and the following relay coils are connected across and energizable from the bus lines BL1 and BL2 when the various contacts in series therewith are closed; namely, a system run relay 1SRR; a run control relay 1RCR; a master control relay 1CR1; a forward control relay 1CR2; a reverse control relay 1CR3; and a main contactor 1MC. System run relay 1SRR is connected in series with an emergency stop normally closed push-button switch 35 and with a normally open push-button start switch 36 which has holding contacts 1SRR in parallel therewith. Run control relay 1RCR is in series with normally open contact 1SRR. Master control relay 1CR1 is connected in series with one of its normally open contacts 1CR1, with a normally open run control relay contact 1RCR, and with a check circuit 37, which is understood to comprise a number of normally open contacts which must be closed before the system can operate, such as phase rotation contacts, thermostatically controlled contacts, and so forth. The main contactor relay coil 1MC is connected in series with the following relay contacts which are connected in parallel with each other, namely, 1CR3, 1CR1, and 1CR2.

Induction master control 33 has an operator's control handle 32 enabling it to be operated from an off position to a forward speed point F to close its forward contact F, or to a reverse speed point R to close its reversing contact R. Induction master control 33 also comprises a variable output transformer 40 which provides a variable output alternating current voltage signal at its output terminal 38 and 39, which signal is proportional to handle throw, and is used for motor control purposes, being applied to terminals 38 and 39 shown in FIG. 2. The induction master control 33 is a conventional known type of motor control device. It is to be noted that the relay coils 1CR2 and 1CR3 shown in FIG. 1 control the normally open similarly designated contacts in FIG. 2 to effect operation of the appropriate firing pulse generators for operation of the motor in the forward or reverse direction in response to operation of the induction master control 33. It should also be noted that closure of any one of the normally open contacts 1CR1, 1CR2, or 1CR3 will effect energizing of main contactor coil 1MC and effect closure of the main contacts MC1, MC2, and MC3.

Referring to FIG. 1, the control system comprises means for deriving a voltage signal indicative of the instantaneous voltage in the motor 15. One end of the primary winding of transformer TF2 is connected to the neutral point NP of the motor stator 18. The other end of the primary winding of transformer TF2 is connected to terminal T3 of motor stator 18. Thus, transformer TF2 senses the line-to-neutral voltage in winding W3 of motor stator 18 and provides a voltage signal proportional thereto across the output terminals Y and C of the secondary winding of transformer TF2 which are connected to the multiplier MT.

The control system further comprises means for driving a current signal indicative of the instantaneous current in motor stator 18. Such means comprise a current transformer CT5 which is electrically coupled to phase line L3 between the SCR pair R1 and terminal T3 of the motor stator. One end of current transformer CT5 is connected to a common terminal C on transformer T2, and the other terminal of the current transformer CT5 is connected to terminal X in the multiplier circuit shown in FIG. 3. The current signal appearing as the output of current transformer CT5 is proportional to the current in one of the phase lines to motor 15, namely, phase line L3.

Figure 3:
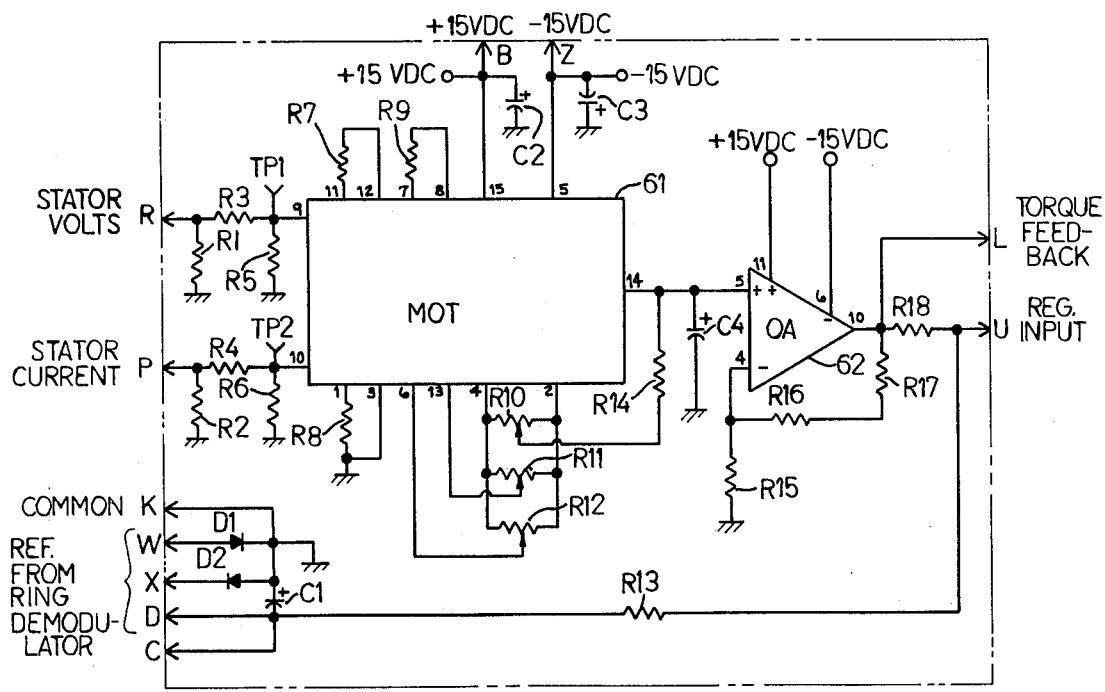
FIG. 3 is a circuit diagram of the multiplier for the torque control portion of the circuit shown in FIG. 1.

Means are provided for multiplying the voltage signal appearing at the output of transformer TF2 and the current signal appearing at the output current transformer CT5 to provide a wattage or torque signal in the form of a voltage which is proportional to the instantaneous torque being developed by motor 15. Referring to FIG. 3 which is a circuit diagram of the multiplier circuit MT shown in FIG. 1, it is seen that the circuit generally comprises a multiplier 61 in the form of a type MC1494L integrated circuit device and an operational amplifier 62. The input terminals 9 and 10 of integrated circuit device 61 are connected to the terminals Y and X, respectively, shown in FIG. 1. The output terminal 14 of integrated circuit device 61 is connected to positive input terminal 5 of operational amplifier 62. The output terminal 10 of operational amplifier 62 is connected to provide an output voltage at its output terminal 10 which is proportional to the torque of motor 15.

The control system further comprises means for deriving a speed signal from motor 15 which is indicative of instantaneous speed. In the embodiment of the invention disclosed herein, the means for deriving the speed signal indicative of instantaneous motor speed measures the frequency of the current flow in rotor 18 rather than the magnitude of the instantaneous rotor voltage. As FIG. 1 shows, the torque signal from multiplier MT and the speed signal from the speed signal detector SFD are fed to a speed/torque logic circuit LC wherein the aforesaid torque signal and speed signal are combined to provide a feedback signal in the form of a voltage signal which is fed to a summing point SP wherein the speed/torque signal is compared to a reference signal from the induction master control 33. If there is a discrepancy in the signals into the summing point circuit SP, an error signal is produced which is fed via regulator RC to effect operation of the appropriate firing pulse generator FPG1 or FPG2, depending on the throw of the handle 32 of the induction master control 33.

In the control system thus far described, there is regulation of both torque and speed of motor 15 to provide smoother acceleration, more tightly regulated speed, better inching speed, and prevention of jerking and swinging of the crane load. In the control system, both torque and speed are automatically regulated, and both torque and speed are proportional to the throw of the operating handle 32 of the induction master control 33, as shown in the graph in FIG. 4. In the graph in FIG. 4, motor speed (and its equivalent, motor slip) are plotted against percentage of torque developed by motor 15 as a function of the handle throw of the induction master control 33. The upper one-half of the graph shown in FIG. 4 indicates conditions wherein the actual direction in which the motor 15 is being driven is in agreement with the direction requested by the induction master control 33. In the lower portion of the graph in FIG. 4 there is a condition wherein the direction in which the motor 15 is rotating is in disagreement with the direction requested by the induction master control 33, i.e., wherein the motor is being plugged. It is to be noted in the graph in FIG. 4 that torque vs. handle settings of the induction master control can be independently set, that is to say, the percentage of torque produced in response to a particular handle setting will not necessarily be the same during plugging as during powering in the requested direction. The circuitry which accomplishes this will be described subsequently.

Regarding the signals produced by transformer TF2 and current transformer CT5, it is to be understood that as the SCRs in SCR bank 22 are phased on, the voltage and current flow in motor 15 correspondingly increase.

Characteristically in a system employing SCRs, voltage wave shapes may be choppy and of poor quality and may be difficult to discern on an instantaneous basis. Accordingly, it is preferable to employ the speed sensing signal means shown in FIG. 5 wherein frequency is measured to provide the speed signal. In the embodiment shown in FIG. 5, operational amplifiers 70 are employed as an active filter. The circuit employs a "fourth order filter" which has a relatively sharp cutoff. The relatively small operational amplifier circuit shown in FIG. 5 offers cost and space advantages over large inductor/capacitor type filtering systems heretofore employed in motor control systems.

As FIG. 1 shows, the speed control signal is derived from the terminals M1, M2, and M3 of the motor rotor 20. As will be understood, the frequency in motor 15 will vary between 0 to 120Hz. More specifically, frequency varies between 0 and 60Hz during motor powering, and between 60 and 120Hz during plugging. When the motor 15 is stalled, frequency is at 60Hz, and when motor is at synchronous speed, frequency is at 0. During plugging, frequency is at 60Hz at stall, and at 120Hz when fully plugged, i.e., when the motor is at maximum speed in the opposite direction and motor slip equals 2.

SF STATIC FREQUENCY DETECTOR SPECIFIC DESCRIPTION

Figure 6:
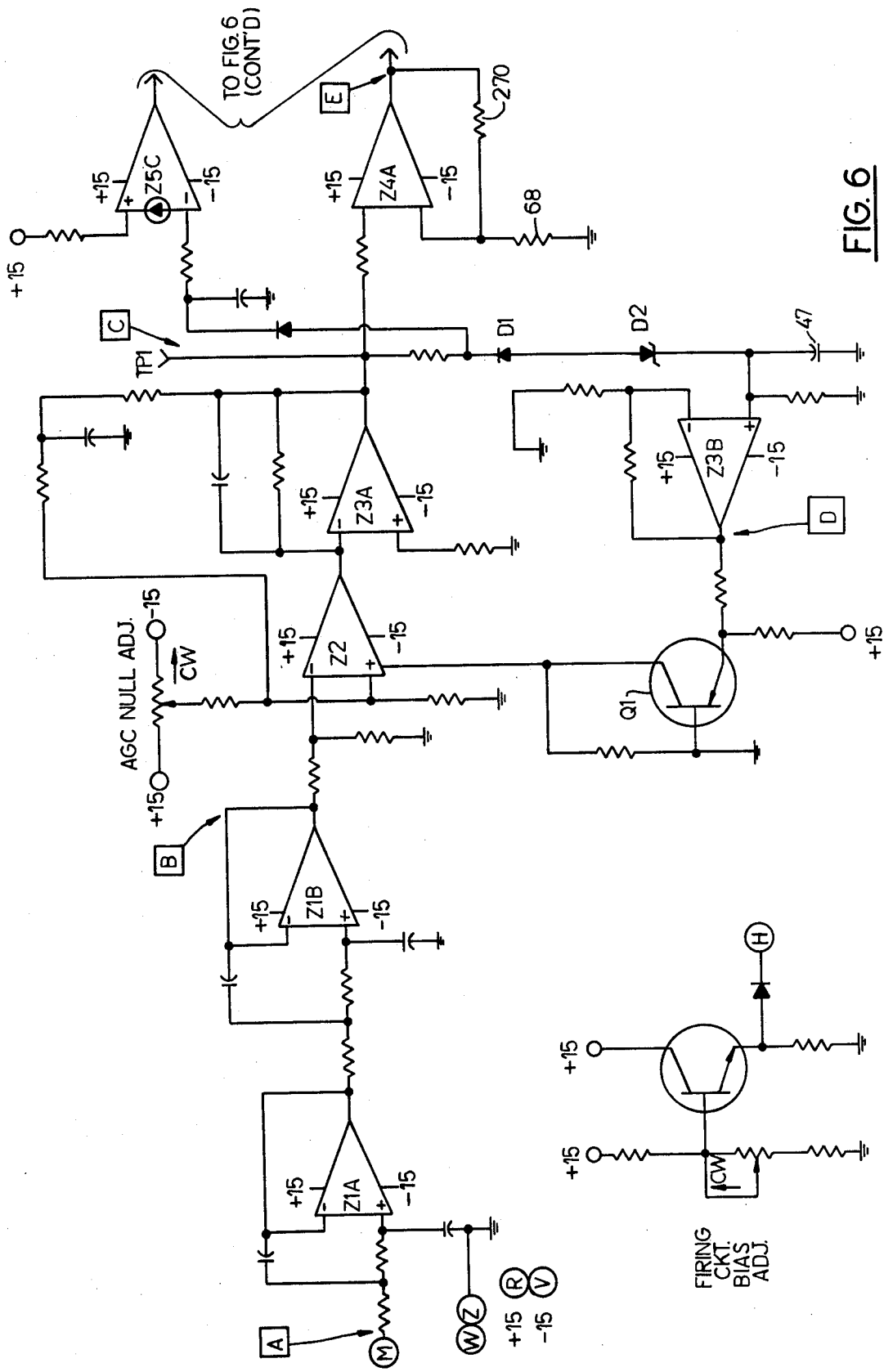
FIG. 6 (two sheets) is a circuit diagram of the frequency detector shown in FIG. 5.
Figure 6:
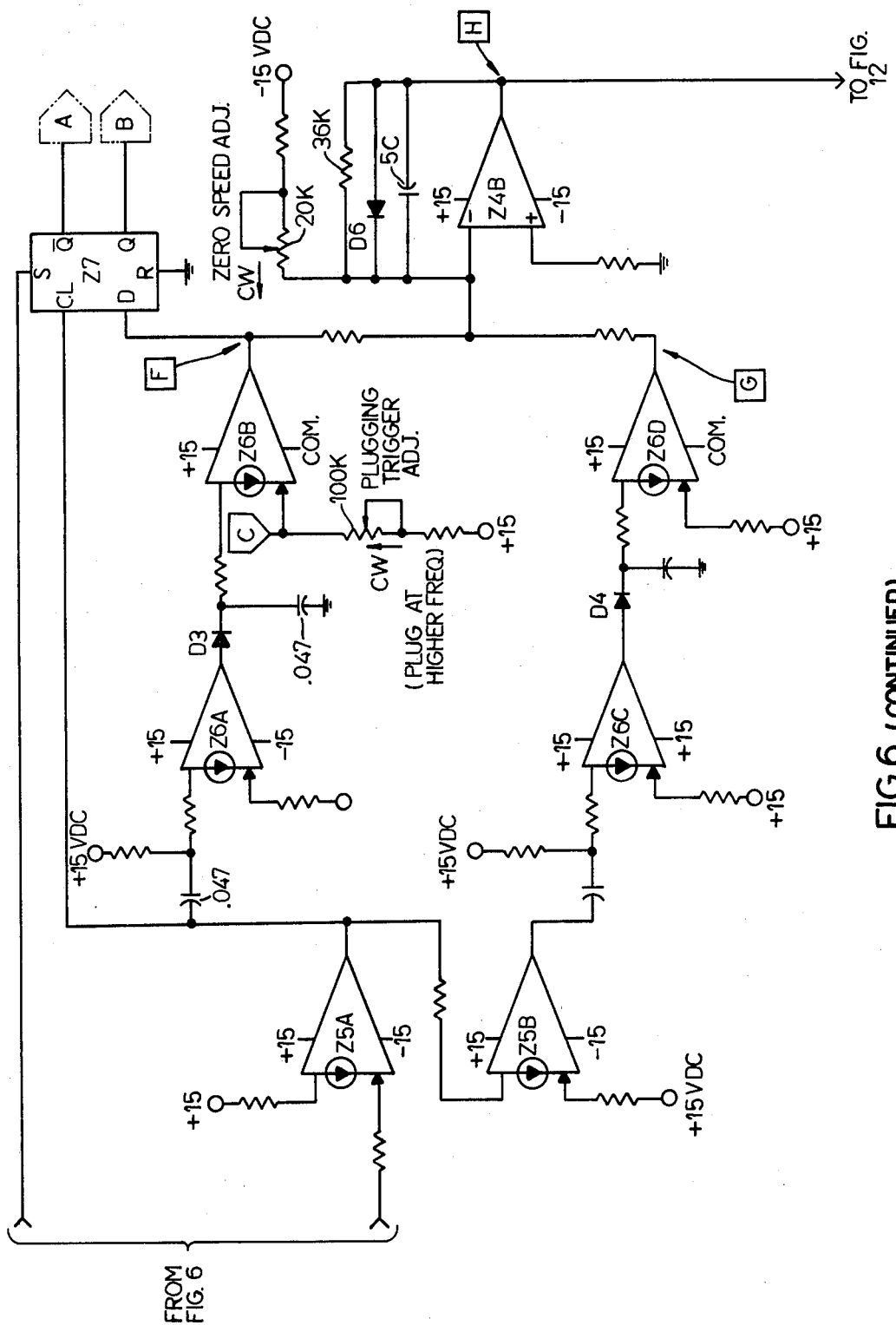

The speed sensing means shown in FIG. 6 is based on the following principles. For fixed frequency primary excitation of a wound rotor motor the fundamental frequency on the secondary bears a direct relationship with the speed of shaft rotation. This is given by $$n = (1 - \frac{f_{SEC}}{f_{LINE}})(n_{SYNC})$$

Thus if secondary frequency can be accurately sensed, an exact indication of shaft speed can be obtained. The control disclosed herein is a fixed frequency primary excitation motor control and as such follows the above equation. Therefore, the fundamental problem in determining motor speed becomes one of accurately sensining secondary frequency.

In the control system disclosed herein, motor control is achieved by varying the applied primary voltage. This is accomplished by changing the conduction angle of the SCRs in bank 20 in series with the three phase lines L1, L2 and L3. However, this method of control creates two complications with regard to sensing secondary frequency. First, the fact that primary voltage is being modulated increases the dynamic range of voltages which must be sensed at the motor secondary 20. This is in addition to the so called "variable turns transformer effect" which occurs naturally as motor speed varies. Secondly the switching waveforms generated by the SCRs in bank 20 inject many additional frequencies into the secondary waveform which must be rejected when sensing for the fundamental frequency.

Figure 5:
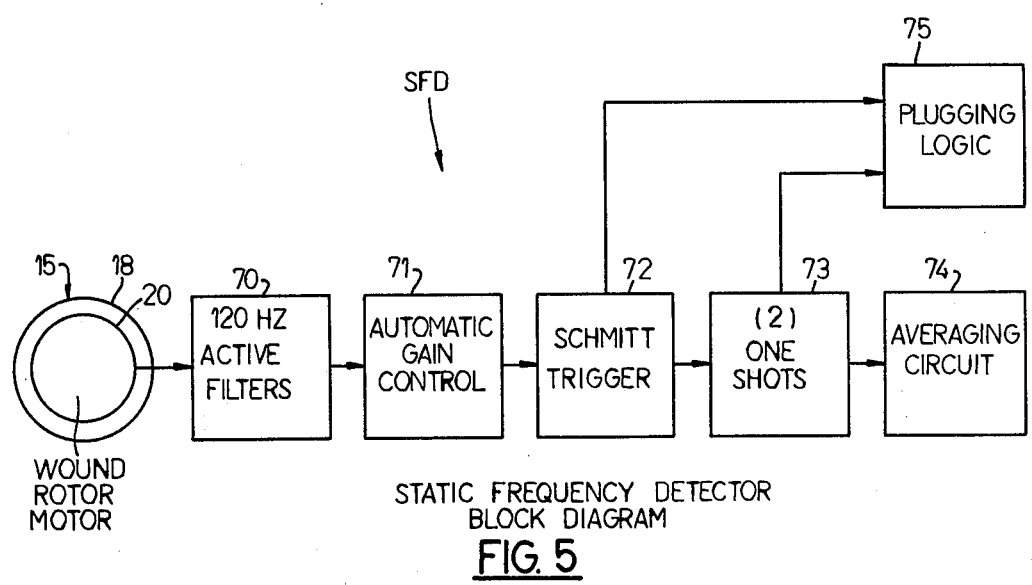
FIG. 5 is a schematic block diagram of the frequency detector for the speed control portion of the circuit shown in FIG. 1.

FIG. 5 is a block diagram showing the basic circuit sections of the frequency detector SFD and shows how they are linked. The first three blocks 70, 71 and 72 contain circuitry used to extract the fundamental frequency from the motor secondary waveform. The last two blocks 73 and 74 comprise circuitry to change the fundamental frequency into a more useable analog voltage level proportional to speed. The upper "Plugging Logic" block 75 is basically a frequency comparitor which puts out a logic "0" or "1" depending upon whether or not plugging is taking place.

Figure 7:
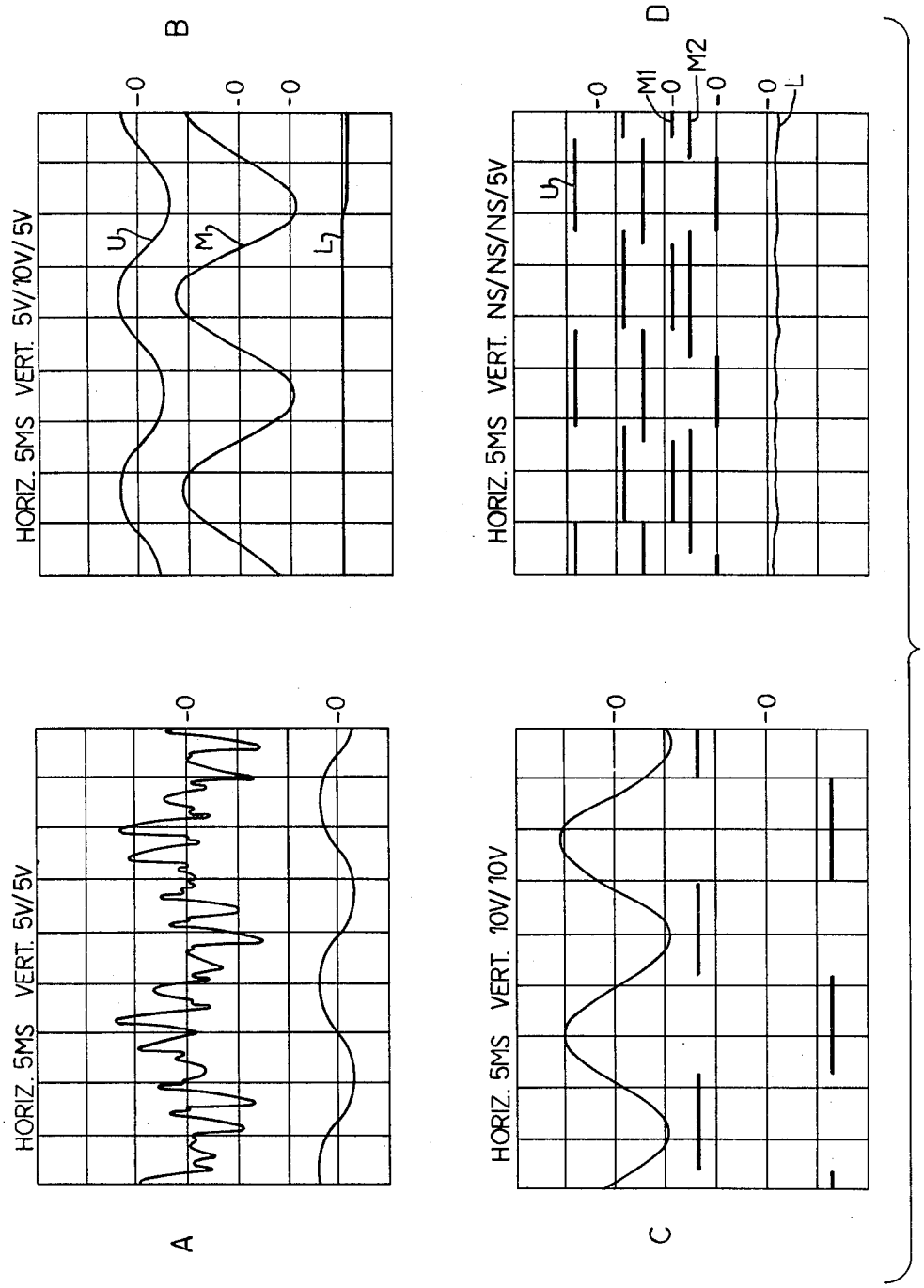
FIGS. 7, 8, 9, 10, and 11 each show families of curves illustrating electrical conditions in various positions of the circuit shown in FIG. 6.
Figure 8:
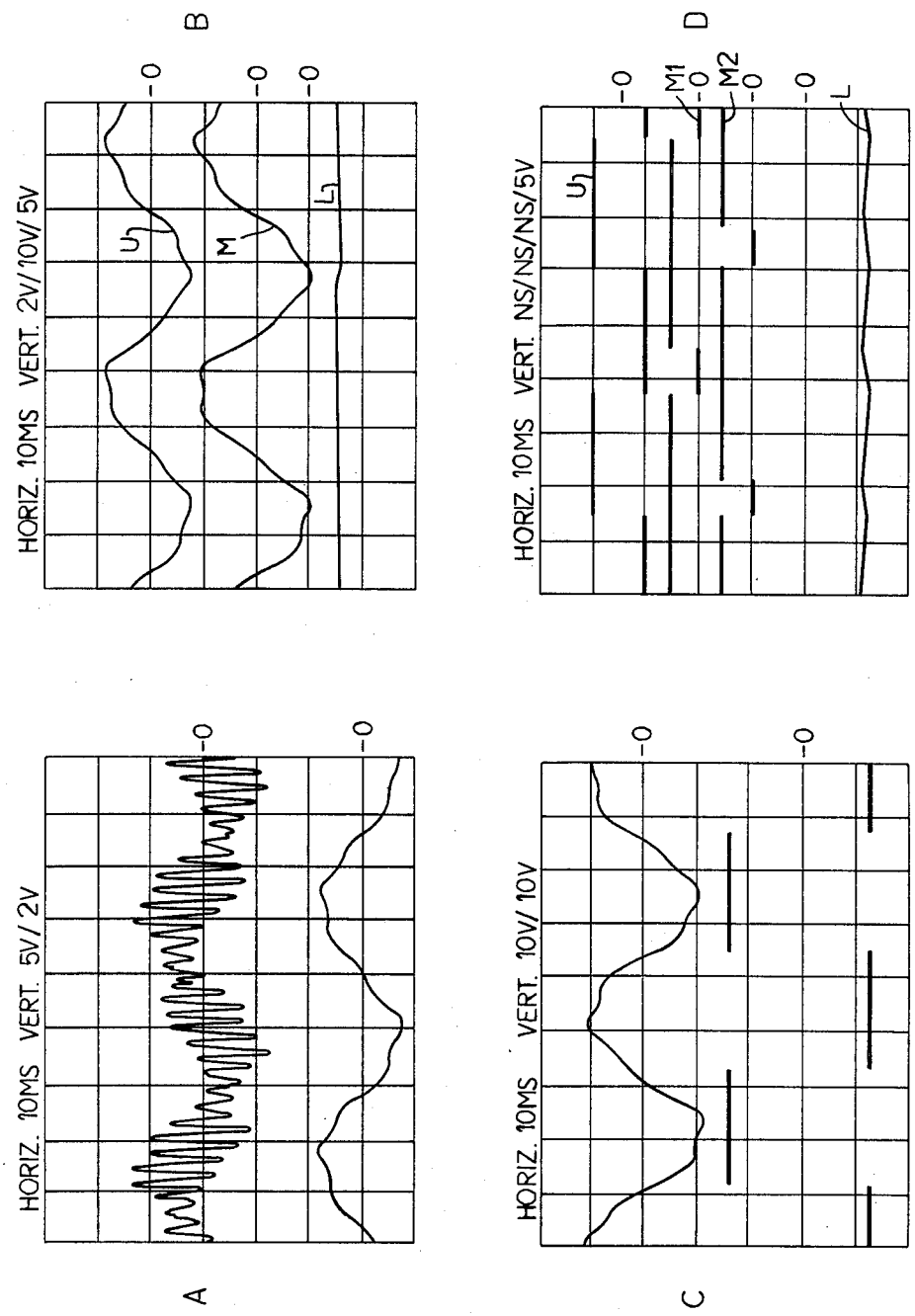
Figure 9:
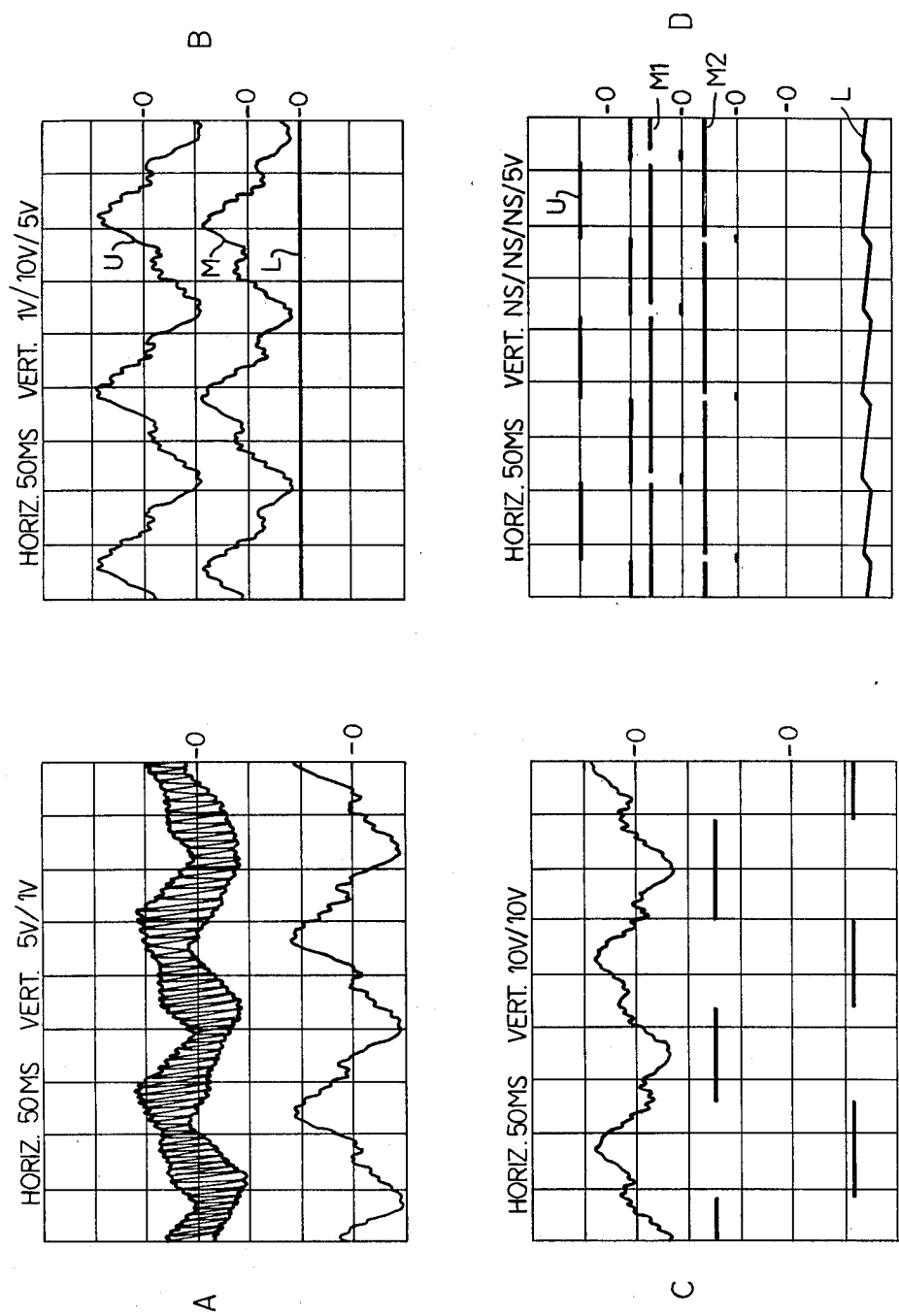

FIG. 6 is a schematic diagram of the frequency detector SFD. Its operation will now be described in detail. Operational amplifiers Z1A and Z1B together comprise a fourth order Chebyshev active filter with 2 db ripple. Cutoff frequency is designed at 120Hz and rolloff is 28 db per octave. Thus at 360Hz (the primary SCR ripple frequency) the input is attenuated by a factor approximately 25. FIGS. 7A, 8A, and 9A show photographs of oscilloscope traces for secondary frequencies of 55Hz, 20Hz, and 5Hz, respectively. In each case the upper trace in FIGS. 7A, 8A, and 9A is the secondary voltage as applied at reference point A in FIG. 6. The lower trace in FIG. 7A, 8A, and 9A is the output of the active filter as viewed at reference point B in FIG. 6. Note that the filter output voltage varies from 2.5 volts peak at 55Hz to 1.0 volts peak at 5Hz. Under transient conditions when speed change is taking place, secondary voltages vary over a much wider range (approximately 10 to 1). This necessitates the use of an automatic gain control 71.

Operational amplifiers Z2, Z3A, and Z3B and transistor Q1 constitute such an automatic gain control system. Amplifier Z2 is the amplifier which actually exhibits variable gain. Its gain is determined by its bias current which is in turn controlled by transistor Q1. The output of amplifier Z2, which is known more exactly as an operational transconductance amplifier, is a current signal. Amplifier Z3A amplifies this signal and converts it to a variable voltage. Whenever the peak output voltage becomes more negative than approximately 10.5 volts negative diodes D1 and D2 (zener) conduct charging the 47 microfarad capacitor 47 at the noninverting input of amplifier Z3B. This drives amplifier Z3B negative which in turn reduces the bias current into Z2 via transistor Q1. The gain of amplifier Z2, therefore, decreases and the 10.5 volt peak tends to be reduced. During normal operation the output of amplifier Z3A is maintained within a 10.5 to 12 volt (peak) band. Under high speed lightly loaded conditions, the output of amplifier Z1B can drop so low that even the maximum gain of amplifier Z2 is not sufficient to generate a 10.5 volt (peak) signal at the amplifier Z3A output. Under these conditions the automatic gain control circuit 71 effectively works as an open loop circuit with high gain. The effective dynamic range of the circuit is approximately 26 db. The time constant for the bias current which controls gain is somewhat of a compromise. It must be chosen long enough such that low frequency waveforms are not excessively distorted, and be short enough such that the circuit has a reasonable recovery rate to reduced input signal. A time constant of approximately 0.5 seconds was chosen. FIGS. 7B, 8B and 9B show oscilloscope traces for the automatic gain control 71 at 55Hz, 20Hz, and 5Hz, respectively. The trace U is the input at point B in FIG. 6. The middle trace M is output at point C in FIG. 6 The lower trace L is the bias control voltage at point D in FIG. 6. Note that although the input voltage varies from 2.5 volts peak (FIG. 7B)

to 1.0 volt peak (FIG. 9B), the output voltage varies from only 11 volts peak (see FIG. 7B) to 9.5 volts peak (see FIG. 9B).

The signal at point C in FIG. 6 is now a relatively well filtered, relatively constant voltage signal. It is desired to convert this signal to a square wave of the same fundamental frequency. Note, however, that the signal at C in FIG. 6 still has a tendency toward multiple zero crossings. For this reason a Schmitt trigger circuit 72 is used. Operational amplifier Z4A provides this function. The 270K and 68K resistors 270 and 68 provide a voltage divider for positive feedback into the non-inverting input. This sizing of resistors provides a 6 volt hysteresis about zero. Thus, circuit action is such that the voltage at point C in FIG. 6 must go greater than 3 volts positive in order to drive point E in FIG. 6 to negative saturation. Likewise, the voltage at point C in FIG. 6 must go more negative than 3 volts negative to drive point E in FIG. 6 to positive saturation. FIGS. 7C, 8C, and 9C show the switching nature of this circuit at fundamental frequencies of 55Hz, 20Hz, and 5Hz, respectively. In each case, the upper wave shape is point C voltage and the lower is point E voltage.

Figure 10:
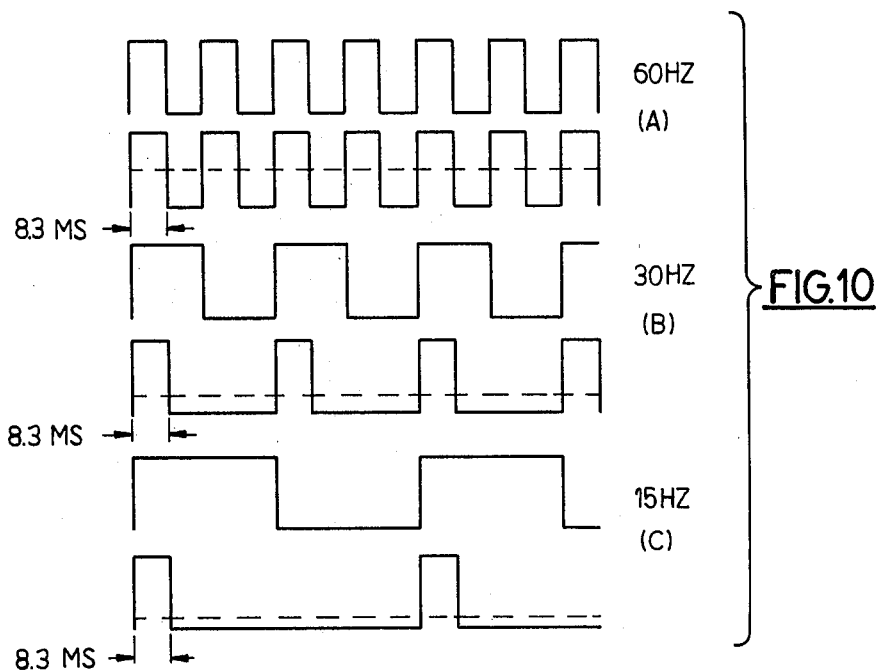

At this point, a square wave has been produced which is of the same fundamental frequency as the voltage on the rotor 20. The final step is to convert this frequency varying square wave signal into an analog DC voltage proportional to speed. How this is accomplished can be seen with the aid of FIGS. 10A, 10B, 10C. The upper waveshapes in FIGS. 10A, 10B, and 10C represent square waves (such as those at point E in FIG. 6) of 60Hz, 30Hz, and 15Hz, respectively. A circuit is provided which triggers on the positive edge of these square waves. Furthermore, this circuit is designed to have a pulse output of fixed time duration. The lower waveshapes in FIGS. 10A, 10B, and 10C represent the output of just such a circuit. The duration of the output pulse is fixed at 8.3 milliseconds regardless of the input square wave frequency. The dashed lines running through these waveshapes in FIG. 10 represent the average level of the pulse train. If the peak of the pulse is taken at 100%, then the average levels are 50%, 25%, and 12.5% for FIGS. 10A, 10B, and 10C, respectively. Note that these percentages are in direct proportion to the frequencies involved (60, 30, 15). In general, the average of the lower pulse trains in FIG. 10 is directly proportional to the frequency of the upper square wave.

A circuit which when triggered provides a constant time duration output pulse is called a one-shot (or, more technically, a monostable multivibrator). The frequency detector circuit FDC uses two such one-shots designated 73 in FIG. 5 and Z6A/B and Z6C/D in FIG. 6.

Operational amplifiers of a somewhat different type are used to implement these one-shots 73. These operational amplifiers designated Z5A, Z5B, Z6A, Z6B, Z6C, and Z6D are of the current mirror type. Specifically, the National LM3900 is used. Basically, the output of each device is a function of the differential current applied at its input terminals (as opposed to input differential voltage on most operational amplifiers). Since these operational amplifiers are designed to operate from a single level power supply, the output of device Z4A must be level shifted to a signal which operates between +15 and common. Device Z5A accomplishes this function. Its output is identical with the output of Z4A but swings only between +15 and common.

The constant time duration output pulse shown in FIGS. 10A, 10B, and 10C can be more easily filtered if a pulse is produced for both the rising and falling edges of the triggering square wave. To help accomplish this, amplifier Z5B is used as a simple inverter. Its output is exactly 180° out of phase with the output of amplifier Z5A. The outputs of both amplifier Z5A and Z5B are now sent to separate and nearly identical one-shots designated Z6A/B and Z6C/D. Devices Z6A and Z6B along with associated components comprise one one-shot. Devices Z6C and Z6D along with associated components comprise another one-shot. Since both one-shots are almost identical only one will be described. As initial conditions assume that first, the output of device Z5A is high, second, that the capacitor .047 at the input of device Z6A is uncharged, third, that thus the output of device Z6A is low, fourth, that the capacitor .047 at the input of device Z6B is uncharged, and fifth, that thus the output of device Z6B is high. Now, assume that device Z5A switches to the low state; since the input capacitor .047 of device Z6A is not charged, the positive current flowing into the inverting terminal of device Z6A is reduced to almost nothing and its output immediately switches to the high state. This rapidly charges the capacitor .047 at the input of device Z6B and causes its output to switch to the low state. Thus, when device Z5A goes low, device Z6B goes low. The input capacitor .047 to Z6A now begins to charge while simultaneously the current into the inverting input of device Z6A increases. When this current gets high enough, the output of device Z6A again switches to the low state. The capacitor .047 at the input to device Z6B then begins to discharge thus decreasing the current into the inverting terminal of device Z6B. When this current becomes low enough, device Z6B switches back to the high state. This completes the cycle which yields the constant time duration output pulse.

Operation of amplifiers Z6C and Z6D is identical except that because the square wave trigger from amplifier Z5B is phase shifted 180° from that of amplifier Z5A, the output pulses from amplifier Z6D are time displaced an appropriate amount.

One clarification should be made at this point. The outputs of amplifiers Z6B and Z6D go low during the constant time duration pulse period. This is just the opposite of the pulses shown in FIG. 10A, 10B, and 10C which are shown this way since it is easier to visualize. For circuit convenience reasons, actual output pulses go low during the timing period. This, of course, in no way affects the validity of the concept involved.

FIGS. 7D, 8D, and 9D show the above-described circuit action in terms of input and outputs. Frequencies are again 55Hz, 20Hz, and 5Hz, respectively. The top traces U in 7D, 8D, and 9D are outputs of device Z4A at point E in FIG. 6. The middle traces M1 are the outputs of device Z6B at point F in FIG. 6. The middle traces M2 are the outputs of amplifier Z6D at point G in FIG. 6. Note that the traces M1 go low on the falling edge of the top traces U. Likewise, the traces M2 go low on the rising edge of the top traces U. This agrees with the above description.

The final step in obtaining a speed feedback signal is to average the outputs of amplifiers Z6B and Z6D by means of averaging circuit 74. Amplifier Z4B shown in FIG. 6 accomplishes this. The parallel RC network comprising resistor 36K and capacitor 5C in its feedback loop makes the operational amplifier Z4B act as an averager.

To understand how the speed feedback is obtained, the conditions on the rotor 20 at stall and at synchronous speed must be analyzed. At stall the rotor frequency will be 60Hz. As synchronous speed is approached, the rotor frequency approaches zero hertz. Thus, 60Hz must correspond to an output of zero and zero hertz must correspond to full output. Since the output of the one-shots 73 is designed for 8.3 milliseconds (½ cycle at 60Hz), amplifiers Z6B and Z6D are on for alternate half cycles at 60Hz. This in effect is the same as having one on continuously while the other remains off. If the output of amplifier Z4B is to be zero under these conditions, an additional input of the same magnitude but of the opposite polarity must be applied. The zero speed adjust potentiometer 20K provides this additional input. It is adjusted such that amplifier Z4B has a zero output when the motor 15 is at stall. As synchronous speed is approached, the outputs of amplifiers Z6B and Z6D approach being high on a continuous basis. The feedback resistor 36K for amplifier Z4B is sized such that when both amplifiers Z6B and Z6D are high on a steady state basis, then the output of amplifier Z4B will be approximately 10 volts negative. The bottom traces L in FIGS. 7D, 8D, and 9D show the output of amplifier Z4B at point H in FIG. 6.

Figure 11:
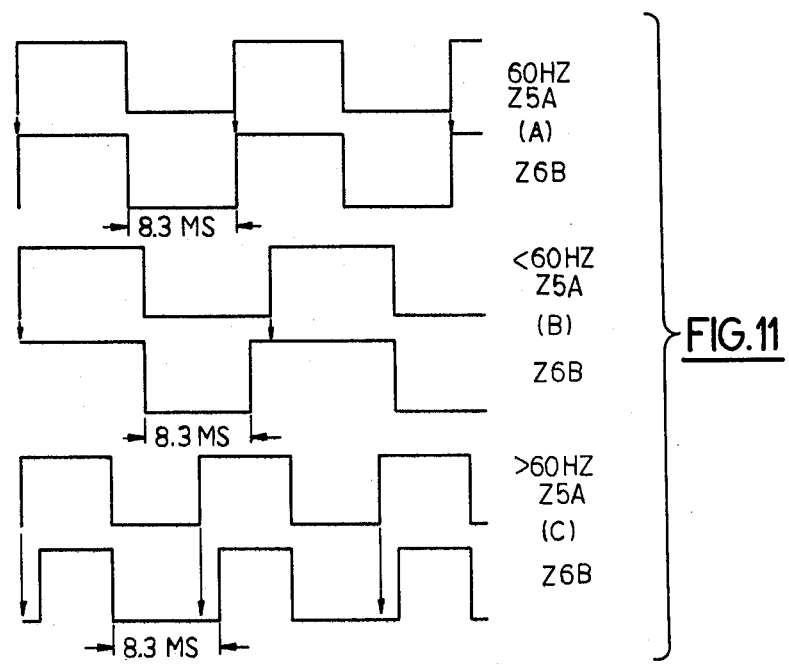

The remaining portion of the circuit to be described in the plugging logic circuit 75. The output of the plugging logic circuit 75 is used by the system to determine whether the system should be in the speed/torque mode (quadrant I) or the straight torque mode (quadrant IV). Operation of the circuit 75 can best be understood by referring to the curves in FIG. 11. FIG. 11 shows the outputs of amplifiers Z5A and Z6B for three rotor frequencies: 60 Hz (FIG. 11A), less than 60 Hz (FIG. 11B), greater than 60 Hz (FIG. 11C). In analyzing these waveforms two things should be kept in mind. First, the transition of amplifier Z6B to the low state always occurs simultaneously with the transition of amplifier Z5A to the low state. Second, the time which amplifier Z6B is low is a constant independent of the output frequency of amplifier Z5A. Keeping these facts in mind, now observe the state of amplifier Z6B when amplifier Z5A makes its positive transition for the three frequencies shown. These transition points are indicated by arrows in FIGS. 11A, 11B, and 11C.

Note that for frequencies less than 60 Hz, amplifier Z6B is high at this point; however, for frequencies greater than 60 Hz, amplifier Z6B is low at this point. The positive edge triggered data flip flop device Z7 responds to these signals by making $Q = 1$ for the condition shown in FIG. 11B and $Q = 0$ for condition shown in FIG. 11C, $\overline{Q} = 0$ for the condition shown in FIG. 11B and $\overline{Q} = 1$ for the condition shown in FIG. 11C. Thus, the incoming square wave, the output of the one-shot, and the data flip flop Z7 constitute a frequency comparator which is used by the system to derive plugging logic.

The total circuit also incorporates two other refinements both associated with the plugging logic circuit 75. To understand the first, note the point "C" at the input to device Z6B. Whenever $\overline{Q}$ goes low ($f > 60$Hz) a small additional positive current is brought into the non-inverting input of amplifier Z6B at point "C". This reduces the width of the constant time duration output pulse by a slight amount. When $\overline{Q}$ goes high, the small additional current is removed and the output pulse widens slightly. The effect of this slight pulse width manipulation is to slightly vary the trigger frequency of the plugging logic circuit 75. When properly adjusted (after plugging trigger adjustment potentiometer 100K has been set) Q will switch from high to low at 62Hz and from low to high at 58Hz. Thus, true total circuit action is that of a frequency comparator with hysteresis and a 60Hz center frequency. This circuit refinement insures clean logic switching.

The second circuit refinement centers around amplifier Z5C. As synchronous frequency is approached, rotor voltage becomes very low. If the output of amplifier Z3A drops below 3 volts peak, amplifier Z4A stops switching. This in turn causes both amplifiers Z6B and Z6D to remain high. Amplifier Z4B then integrates to full output indicating that synchronous speed has been reached. In fact, the drive is probably running at a somewhat slower speed; thus, the feedback exceeds the reference and the regulator turns off. The drive begins to slow down and rotor voltage increases. The output of amplifier Z3A goes above 3 volts and switching again begins. The drive accelerates to a higher speed and the whole cycle begins again. The total speed deviation is about 5%. It only occurs when the handle 32 is placed just slightly less than full. During the acceleration process at this high speed, the waveform on the rotor 20 can be of a very choppy nature. This can false trigger the plugging logic flip-flop device Z7 such that plugging is indicated even though in fact operation near synchronous speed is taking place. Amplifier Z5C is used to eliminate this. Whenever the output of amplifier Z3A drops below about 6 volts peak, amplifier Z5C has a positive output. This output is fed to the set input of flip flop device Z7 insuring that Q stays high indicating that plugging is not taking place. Under normal operation, amplifier Z5C is low and has no effect on circuit operation.

LC TORQUE/SPEED LOGIC CIRCUIT SPECIFIC DESCRIPTION

Figure 4:
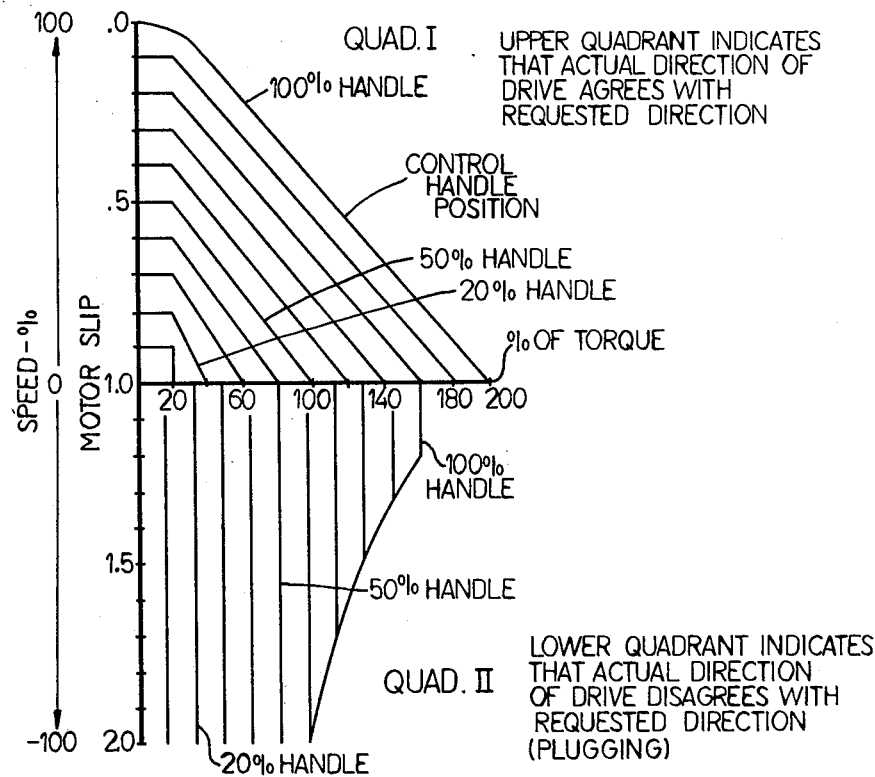
FIG. 4 is a graph depicting motor speed (and motor slip) plotted against percentage of motor torque in various operating positions of the operator's control handle.
Figure 12:
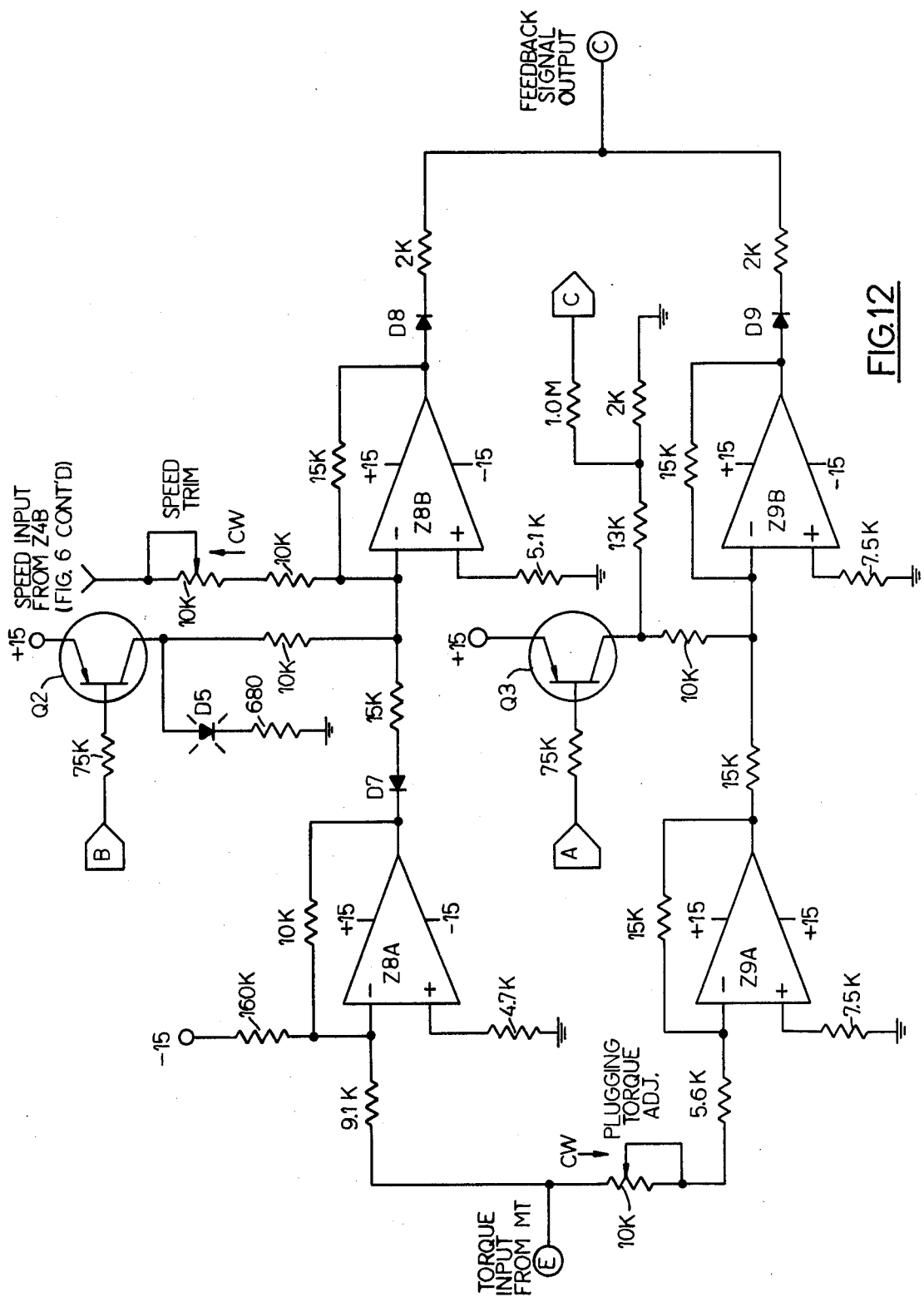
FIG. 12 is an electric circuit diagram of the torque/speed logic circuit shown in FIG. 1.

The function of the torque/speed logic circuit LC, shown in FIGS. 1 and 6, is to combine the torque signal from multiplier MT and the speed signal from static frequency detector SFD into a composite feedback signal which will generate the torque/speed curves shown in FIG. 4. FIG. 12 is the schematic diagram of the speed/torque logic circuit LC which is used to accomplish this function. Turning first to an examination of operation in quadrant IV of FIG. 4, note that torque is a function of handle throw independent of speed. Thus, in quadrant IV which corresponds to plugging, the system performs as a pure torque regulator. From the description of static frequency detector SFD, it will be remembered that when plugging was taking place, the Q output of flip-flop device Z7 is low and the $\overline{Q}$ output is high. The points "A" and "B" in FIG. 6 connected to these outputs are in turn connected to transistors Q3 and Q2 in FIG. 12. Now, if Q is low then point "B" is low which in turn turns Q2 on. This puts a positive signal into the inverting input of amplifier Z8B which drives its output negative. The signal from transistor Q2 is strong enough to override any negative signal coming from amplifier Z4B (speed signal). Since diode D8 will block the negative output of amplifier Z8B, it does not contribute to the feedback signal output at point "C" in FIG. 12.

As previously stated, the point "A" during this time will be high, thus, transistor Q3 does not conduct and has no effect on circuit action. The positive torque input from multiplier MT is applied at point "E". Amplifier Z9A inverts this signal while the plugging torque adjustment CW allows its magnitude to be adjusted. Amplifier Z9B again inverts the signal back to a positive signal which diode D9 passes on to the point "C," which serves as the feed back signal output.

Operation in quandrant I OF FIG. 4 is somewhat more complicated. In quadrant I where plugging is not taking place, $Q = 1$ and $\overline{Q} = 0$ (see amplifier Z7 in FIG. 6). Therefore, point "B" is high and point "A" is low. Transistor Q3 turns on and puts amplifier Z9B into negative saturation. The signal from transistor Q3 swamps any signal from amplifier Z9A. Diode D9 blocks the negative signal from amplifier Z9B and thus amplifier Z9A and Z9B do not contribute to the feedback signal output at point "C".

Since point "B" is high, transistor Q2 is off and it does not effect circuit action. Amplifier Z8B thus has two active inputs: the output of amplifier Z8A and the speed input from amplifier Z4B. The output of amplifier Z8A equals the torque input from multiplier MT minus an adjustable constant. Subtracting this adjustable constant creates the flat speed/torque curves at low torque levels, as shown in FIG. 4. As FIG. 12 shows, the 160K resistor at the inverting input of amplifier Z8A generates this negative adjustable constant.

The output of amplifier Z8A (torque minus a constant) and the output of amplifier Z4B on the speed frequency detector SFD (speed) are then summed by amplifier Z8B generating the curves with a sloping characteristic, shown in FIG. 4. Diode D8 passes this signal to the feedback signal output at point "C".

I claim:

1. Means for ascertaining the instantaneous rotor speed of an alternating current induction motor having a rotor and a stator and energizable from a source of alternating current electric power comprising:
   first means for detecting the instantaneous waveform of the current flow in said motor rotor;
   second means for extracting the fundamental frequency from said waveform and for providing a square wave signal related thereto;
   and third means for receiving and converting said square wave signal into an analog voltage signal proportional to speed.

2. A combination according to claim 1 wherein said first and second means comprise a fourth order active filter, an automatic gain control, and a Schmitt trigger circuit providing a square wave, and wherein said third means comprises at least one monostable multi-vibrator for converting said square wave to a constant time duration direct current output pulse.

3. In a control system for regulating the speed of an induction motor energizable from an alternating current source through a controlled rectifier bank, in combination:
   an operator's control movable to selected positions to effect motor operation and for providing a reference signal related to a selected position;
   means for sensing the instantaneous frequency of the current in said rotor and for providing a speed signal related to instantaneous rotor speed;
   means for providing a feedback signal related to said speed signal;
   and means for comparing said feedback signal and said reference signal and for providing an error signal for regulating said controlled rectifier bank to thereby regulate speed for a selected position of said operator's control.

4. A control system according to claim 3 wherein the means for sensing the instantaneous frequency and for providing a speed signal related to the instantaneous rotor speed comprises:
   first means for detecting the instantaneous waveform of the current flow in said motor rotor;
   second means for extracting the fundamentals frequency from said waveform and for providing a square wave signal related thereto;
   and third means for receiving and converting said square wave signal into an analog voltage signal proportional to speed.

5. A control system according to claim 4 wherein said first and second means comprise a fourth order active filter, an automatic gain control, and a Schmitt trigger circuit providing a square wave, and wherein said third means comprises at least one monostable multivibrator for converting said square wave to a constant time duration direct current output pulse.

6. In combination:
   an alternating current induction motor energizable from an alternating current source through a controlled rectifier bank and a control system for regulating the speed of said motor,
   said control system comprising:
   an operator's control having an operating member movable between a neutral position and any one of a plurality of operating positions, said control providing a reference signal related to handle movement and position;
   means for providing a speed signal related to instantaneous rotor speed, said means for providing said speed signal comprising means for deriving a signal related to the frequency of the current in said motor rotor.
   means for providing a feedback signal related to said speed signal;
   and means for comparing said feedback signal and said reference signal and for providing an error signal for operating said controlled rectifier bank to control motor speed.

7. A control system according to claim 6 wherein the means for providing a speed signal related to the instantaneous rotor speed comprises:
   first means for detecting the instantaneous waveform of the current flow in said motor rotor;
   second means for extracting the fundamental frequency from said waveform and for providing a square wave signal related thereto;
   and third means for receiving and converting said square wave signal into an analog voltage signal proportional to speed.

8. A control system according to claim 7 wherein said first and second means comprise a fourth order active filter, an automatic gain control, and a Schmitt trigger circuit providing a square wave, and wherein said third means comprises at least one monostable multivibrator for converting said square wave to a constant time duration direct current output pulse.

9. A control system for regulating the speed and torque of a reversible alternating current motor having stator windings energizable from an alternating current source through a controlled rectifier bank, comprising:
   an operator's control having a member selectively movable in opposite directions from a neutral position to effect forward and reverse operation of said motor, said control providing a reference signal related to member position;

means for providing a speed signal related to instantaneous rotor speed, said means for providing said speed signal comprising means for deriving a signal related to the frequency of the current in said motor rotor;

means for providing a feedback signal related to said speed signal;

means including a summing circuit for comparing said feedback signal and said reference signal and for providing an error signal;

means including a regulator circuit for processing said error signal and providing a control signal output proportional to said error signal;

and firing pulse generator means for receiving said control signal and for providing firing pulses for operating said controlled rectifier bank to control motor speed.

10. A control system according to claim 9 wherein the means for providing a speed signal related to the instantaneous rotor speed comprises:

first means for detecting the instantaneous waveform of the current flow in said motor rotor;

second means for extracting the fundamental frequency from said waveform and for providing a square wave signal related thereto;

and third means for receiving and converting said square wave signal into an analog voltage signal proportional to speed.

11. A control system according to claim 10 wherein said first and second means comprise a fourth order active filter, an automatic gain control, and a Schmitt trigger circuit providing a square wave, and wherein said third means comprises at least one monostable multivibrator for converting said square wave to a constant time duration direct current output pulse.

* * * * *